US005637143A

United States Patent [19]

Jenkins et al.

[11] Patent Number: 5,637,143

[45] Date of Patent: *Jun. 10, 1997

[54] AQUEOUS RESISTANT METAL PIGMENT-CONTAINING PASTE AND METHOD FOR MAKING

[75] Inventors: William G. Jenkins, Plymouth; Craig Keemer; H. Taylor Lamborn, both of Reading; Michael Curcio, Pen Argyl, all of Pa.

[73] Assignee: Silberline Manufacturing Co., Inc., Tamaqua, Pa.

[*] Notice: The term of this patent shall not extend beyond the expiration date of Pat. No. 5,296,036.

[21] Appl. No.: 513,900

[22] PCT Filed: Aug. 11, 1994

[86] PCT No.: PCT/US94/09160

§ 371 Date: Sep. 7, 1995

§ 102(e) Date: Sep. 7, 1995

[87] PCT Pub. No.: WO95/04783

PCT Pub. Date: Feb. 16, 1995

Related U.S. Application Data

[63] Continuation of Ser. No. 104,548, Aug. 11, 1993, Pat. No. 5,296,032, Ser. No. 104,550, Aug. 11, 1993, Pat. No. 5,348,579, and Ser. No. 136,286, Oct. 15, 1993, Pat. No. 5,356,469.

[51] Int. Cl.$^6$ ............................................. C09C 1/62
[52] U.S. Cl. ........................... 106/404; 106/403; 106/419; 106/431
[58] Field of Search ................................... 106/403, 404, 106/415, 419, 431, 450, 479, 482; 180/165

[56] References Cited

U.S. PATENT DOCUMENTS

| | | | |
|---|---|---|---|
| 3,423,229 | 1/1969 | Kompanek et al. | 106/404 |
| 4,370,382 | 1/1983 | Salensky | 106/14.44 |
| 4,693,745 | 9/1987 | Kondis | 106/404 |
| 4,808,231 | 2/1989 | Kondis et al. | 106/404 |
| 4,869,754 | 9/1989 | Kawabe et al. | 106/404 |
| 5,215,579 | 6/1993 | Keemer et al. | 106/404 |
| 5,296,032 | 3/1994 | Jenkins et al. | 106/404 |
| 5,348,579 | 9/1994 | Jenkins et al. | 106/404 |
| 5,356,469 | 10/1994 | Jenkins et al. | 106/404 |

*Primary Examiner*—Helene Klemanski
*Attorney, Agent, or Firm*—Merchant, Gould, Smith, Edell, Welter & Schmidt

[57] ABSTRACT

Metal pigment particles which are treated with a heteropolyanion compound, a phosphosilicate compound or a combination of a heterpolyanion compound and a phosphosilicate compound show increased stability against attack by water. The particles are especially useful in aqueous coating compositions.

36 Claims, No Drawings

AQUEOUS RESISTANT METAL PIGMENT-CONTAINING PASTE AND METHOD FOR MAKING

CROSS-REFERENCE TO RELATED APPLICATIONS

The present application is a continuation of Ser. Nos. 08/104,548, filed Aug. 11, 1993, 08/104,550, filed Aug. 11, 1993, and 08/136,286 filed Oct. 15, 1993, now U.S. Pat. Nos. 5,296,032, 5,348,579 and 5,356,469 respectively.

FIELD OF THE INVENTION

The present invention is related to paste compositions containing metal pigment particles suitable for forming coating compositions, particularly aqueous coating systems. Increasingly stringent environmental regulations have required that coating systems dramatically reduce volatile organic solvent levels. One way to comply with such regulations is to use water in place of the volatile organic solvents previously used.

BACKGROUND OF THE INVENTION

Within this application several publications are referenced by arabic numerals within parentheses. Full citations for these references may be found at the end of the specification immediately preceding the claims. The disclosures of these publications in their entireties are hereby expressly incorporated by reference into this application.

In the area of coating systems utilizing metal pigment particles, aqueous systems present rather formidable difficulties. This is particularly true with respect to aluminum and zinc pigments. Thus, the metal pigment can readily react with water to generate hydrogen gas. The amount of gas generated can produce a safety hazard, creating high pressures within the composition containers. Also, the water reaction substantially diminishes the aesthetic value of metal pigments. The reaction of aluminum pigments with water can be depicted as follows:

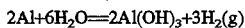

$$2Al + 6H_2O = 2Al(OH)_3 + 3H_2(g)$$

Due to the increasing demand for aqueous systems, a number of techniques have been proposed for inhibiting the attack on the pigment particles by water. Unfortunately, most of these techniques have not provided sufficient protection.

One technique that provides inhibiting properties is the passivation of the metal pigment particles with an ionic organic phosphate as disclosed by Williams et al., U.S. Pat. No. 4,565,716, the disclosure of which is incorporated herein by reference. Another technique involves the use of compounds containing hexavalent chromium or pentavalent vanadium compounds as disclosed in Kondis U.S. Pat. No. 4,693,754, the disclosure of which is incorporated herein by reference. Other techniques include the use of organic phosphites as disclosed in Kondis et al. U.S. Pat. No. 4,808,231, the disclosure of which is incorporated herein by reference, or the use of nitroparaffin solvents. Still another technique includes the use of either (a) an ionic organic phosphate compound, for example as taught in Williams et al., U.S. Pat. No. 4,565,716, or (b) a pentavalent vanadium compound, for example as taught in Kondis, U.S. Pat. No. 4,693,754, or (c) an organic phosphite compound, for example as taught in Kondis et al. U.S. Pat. No. 4,808,231, in combination with a nitro-containing solvent such as a nitroparaffin as disclosed in Keemer et al., U.S. Pat. No. 5,215,579, the disclosure of which is incorporated herein by reference.

The treated metal pigment particles can be used to form a metal pigment paste. The treatment produces a metal pigment paste which has improved gassing stability over conventionally treated products.

SUMMARY OF THE INVENTION

The present invention is directed to metal particles which have been treated with (1) at least one heteropoly anion, (2) at least one phosphosilicate pigment or (3) a combination of at least one heteropoly anion and at least one phosphosilicate pigment. The metal particles, (e.g. aluminum flakes), which have been treated in this manner are stabilized to a degree suitable for use in aqueous coating systems.

A principle object of the invention is to provide a metal flake which can be used in aqueous systems and which is resistant to hydrogen evolution.

Another object of the invention is to provide a metal flake which maintains acceptable aesthetic values and intercoat and intracoat adhesion in the paint film.

Other objects, advantages and features of the present invention will be more readily appreciated and understood when considered in conjunction with the following detailed description.

DESCRIPTION OF THE PREFERRED EMBODIMENTS

All the disclosed embodiments can be made using conventional compounds and procedures without undue experimentation.

As indicated above, the present invention is based on the discovery that certain types of heteropoly anion compounds, certain types of phosphosilicate compounds, or a combination thereof, effectively stabilize metal pigments from reacting with water, rendering the metal pigment suitable for use in water-based coatings without significant evolution of hydrogen without loss of adhesion, or degradation of optical properties. The present invention is especially useful for zinc, aluminum and bronze pigments.

Heteropoly anions are polymeric oxoanions which are formed by the acidification of solutions containing the requisite simple anions or by introduction of the hetero element ion after first acidifying the molybdate or tungstate anions. Heteropoly anions are described in Table 22C-2, at page 857 of Advanced Inorganic Chemistry by Cotton and Wilkenson[1], the entire disclosure of which is incorporated herein by reference. The largest and best known group of heteropoly anions is composed of those with the hetero atom(s) enshrouded by a cage of $MO_6$ octahedra. One of the most common structures of heteropoly anions is the Keggin structure which is represented by $[X^{+n}M_{12}O_{40}]^{(8-n)-}$ where M represents molybdenum or tungsten and X represents silicon, germanium, phosphorus, arsenic, titanium, zirconium, etc. Preferred heteropoly anion groups are the heteropoly molybdates and the heteropoly tungstates. Preferred heteropoly anion compounds are silicomolybdic acid (SiMoA), phosphotungstic acid (PWA) and silicotungstic acid (SiWA). An especially preferred compound is phosphomolybdic acid (PMoA). The concentration of the heteropoly anion compound should be from 0.1% to 30%, preferably from 1% to 10%, based on the metal particle weight.

Phosphosilicate pigments contain phosphorous, silicon and oxygen. Examples of phosphosilicate pigment compounds are calcium phosphosilicate, calcium strontium phosphosilicate and aluminum zirconium zinc phosphosilicate. An especially preferred compound is calcium strontium zinc phosphosilicate marketed by Halox Pigments of Hammond, Indiana, under the tradename of Halox SZP391. The amount of the phosphosilicate compound should be from 0.1% to 30%, preferably 10%, based on the metal particle weight.

Solvents for use with the heteropoly anions may include glycol ethers, glycol ether acetates, alcohols, water and nitroparaffins, or any other solvent compatible with coating systems, in which the heteropoly anion is soluble. Among the nitroparaffins for use with heteropoly anions, the lower members of the nitroparaffin series, i.e., nitromethane, nitroethane and 1-nitropropane, are preferred on the basis of toxicological properties and availability. The solvent for use with heteropoly anions should be present at 5% to 100%, but preferably 20% or more, most preferably 35% or more, of the total weight of solvent in the final metal pigment paste. The solvent for use with heteropoly anions is generally about 28% to 50% by weight of the paste. The heteropoly anion solvent may also include surface active agents such as surfactants or anti-foaming agents.

Solvents for use with the phosphosilicate pigments may include mineral spirits, high-flash naphtha, glycol ethers, glycol ether acetates, nitroparaffins, alcohols, acetates, or any other solvent compatible with coating systems. The solvent may optionally include surface active agents such as surfactants, anti-foaming agents and dispersants. Among the nitroparaffins for use with phosphosilicate pigments, the lower members of the nitroparaffin series, (i.e., nitromethane, nitroethane and 1-nitropropane), are preferred on the basis of toxicological properties and availability. The solvent for use with the phosphosilicate pigments should be present in an amount of from 5% to 100%, but preferably 20% or more, most preferably 35% or more, based on the total weight of solvent in the final metal pigment paste.

Solvents for use with the combination of heteropoly anions and phosphosilicate pigments may include glycol ethers, glycol ether acetates, alcohols, water and nitroparaffins, or any other solvent compatible with coating systems, in which the heteropoly anion is soluble. Among the nitroparaffins, the lower members of the nitroparaffin series, i.e., nitromethane, nitroethane and 1-nitropropane, are preferred on the basis of toxicological properties and availability. The solvent for use with heteropoly anions and phosphosilicate pigments should be present at 5% to 100%, but preferably 20% or more, most preferably 35% or more, of the total weight of solvent in the final metal pigment paste. The solvent may also include surface active agents such as surfactants or anti-foaming agents.

A preferred method to incorporate the heteropoly anion compound is a variation of the slurry method taught in Kondis U.S. Pat. No. 4,693,754. A metal pigment particle filter cake or paste, typically containing 50% to 95%, preferably 60% to 85%, of metal pigment in a solvent, is added to a mixture composed of 15% to 94.5%, preferably 65% to 89%, of a solvent in which the heteropoly anion is soluble. The desired amount of the heteropoly anion compound, typically 0.1 to 30%, preferably 1.0–10%, based on the weight of the metal particles, is added to form a reaction mixture. Surfactants, dispersants, anti-foaming agents, etc., may also be added to the reaction mixture. The reaction mixture is agitated at a temperature of from 20° C. to 100° C., preferably ambient to 80° C., for a period of time ranging from 0.5 to 30 hours, preferably 2 to 8 hours. Solvent is then removed to obtain the desired final metal pigment particle content, typically 40% to 90%.

A preferred method to incorporate the phosphosilicate pigment also is to incorporate the phosphosilicate pigment compound by a variation of the slurry method taught in Kondis U.S. Pat. No. 4,693,754. A metal pigment particle filter cake or paste, typically containing 50% to 95%, preferably 60% to 85%, of metal pigment in a solvent, is added to a mixture composed of 15% to 94.5%, preferably 65% to 89%, of a solvent in which the phosphosilicate pigment is dispersable. The desired amount of the phosphosilicate pigment compound, typically 0.1 to 30%, preferably 10%, based on the weight of the metal particles, is added to form a reaction mixture. The phosphosilicate pigment may first be dispersed in a solvent. Surfactants, dispersants, anti-foaming agents, etc., may also be added to the reaction mixture. The reaction mixture is agitated at a temperature of 20° C. to 100° C., preferably ambient to 80° C., for a period of time ranging from 5 minutes to 24 hours, preferably ½ to 2 hours. Solvent is then removed to obtain the desired final metal pigment particle content, typically 40% to 90%.

Likewise, a preferred method to incorporate both the heteropoly anion compound and the phosphosilicate pigment is the variation of the slurry method taught in Kondis U.S. Pat. No. 4,693,754. A metal pigment particle filter cake or paste, typically containing 50% to 95%, preferably 60% to 85%, of metal pigment in a solvent, is added to a mixture composed of 15% to 94.5%, preferably 65% to 89%, of a solvent in which the heteropoly anion is soluble. The desired amount of the heteropoly anion compound, typically 0.1 to 30%, preferably 0.2–10%, based on the weight of the metal particles and the desired amount of the phosphosilicate pigment, typically 0.1% to 30%, preferably 1% to 10%, based on the weight of the metal particles, is added to form a reaction mixture. Surfactants, dispersants, anti-foaming agents, etc., may also be added to the reaction mixture. The reaction mixture is agitated at a temperature of from 20° C. to 100° C., preferably ambient to 80° C., for a period of time ranging from 0.5 to 30 hours, preferably 2 to 8 hours. Solvent is then removed to obtain the desired final metal pigment particle content, typically 40% to 90%.

In addition to the treatment methods described above, another technique is to introduce the heteropoly anion compound, phosphosilicate compound or the combination thereof into a ball mill, along with atomized powder or foil, lubricants and solvents etc. used to produce aluminum pigments. Thus, the metal pigment surfaces are stabilized as they are being generated in the ball mill.

The preferred treatment processes provide excellent stability, regardless of the lubricant used in milling.

The pigment paste obtained can be used in a variety of known coating systems, as a direct replacement for currently used pastes. Examples include maintenance, general industrial, roof coating, and automotive coating systems. Thus, the paste may be used, for example, with acrylic polymer emulsions, water reducible alkyd resin systems, water reducible alkyd/melamine cross-linked systems, waterborne epoxy coatings, polyester emulsions and water reducible polyester melamine coatings.

It is also possible to treat the metal particles after they have been combined with an aqueous coating vehicle. Thus, the heteropolyanion, phosphosilicate or the combination thereof can be added to an aqueous carrier itself either before or after the metal particles have been added to the coating composition. If the heteropolyanion compound, phosphosilicate compound or combination is added after the metal particles are added, the delay should not be long, since a long delay would permit the aqueous carrier to attack the metal particles. In the case where the addition is made to the coating composition, the amounts of heteropolyanion, phosphosilicate or combination thereof can be the same as discussed above for producing treated metal particles in paste form. Simple mixing techniques can be employed.

The treatment with heteropolyanion, phosphosilicate or both can be combined with other treatment methods, including the use of nitroparaffins, ionic organic phosphates, organic phosphites, and vanadium compounds. The other treatment methods can be carried out before, during or after the treatment with heteropoly anion, phosphosilicate or both.

EXAMPLES

Specific embodiments of the invention will now be further described by the following, non-limiting examples.

EXAMPLE 1

124.3 grams of a non-leafing aluminum paste feed TUF-FLAKE® 5843 (non-volatile 70.8%) is slurried with 514 grams of glycol ether PM to yield a slurry concentration of 13.8% aluminum. To this slurry 10% by weight phosphomolybdic acid is added, based on the weight of aluminum in the paste feed. The material is agitated for 5 hours, at 80° C. The slurry is then filter pressed to obtain a finished paste of 64% non-volatile content and then tested for aqueous stability as described below.

EXAMPLE 2

124.3 grams of a non-leafing aluminum paste feed TUF-FLAKE® 5843 is slurried with 514 grams of glycol ether PM to yield a slurry concentration of 13.8% aluminum. To this slurry 10% by weight silicomolybdic acid is added, based on the weight of aluminum paste in the feed. The material is agitated for 5 hours, at 80° C. The slurry is then filter pressed to obtain a finished paste of 69.2% non-volatile content and then tested for aqueous stability as described below.

EXAMPLE 3

124.3 grams of a non-leafing aluminum paste feed TUF-FLAKE® 5843 is slurried with 514 grams of glycol ether PM to yield a slurry concentration of 13.8% aluminum. To this slurry 10% by weight phosphotungstic acid is added, based on the weight of aluminum in the paste feed. The material is agitated for 5 hours, at 80° C. The slurry is then filter pressed to obtain a finished paste of 65.2% non-volatile content and then tested for aqueous stability as described below.

COMPARATIVE EXAMPLE 1

130 grams of a non-leafing aluminum paste feed TUF-FLAKE® 5843 is slurried with 443 grams of glycol ether PM to yield a slurry concentration of 16.1% aluminum. In order to provide a comparative example, no heteropoly anion is added to this slurry. The slurry is then filter pressed to obtain a finished paste of 70% non-volatile content and then tested for aqueous stability as described below.

Each of the finished pastes obtained from the above examples is incorporated into a typical aqueous general industrial coating formulation prepared according to the following procedure. Enough of each paste to yield 20.5 g of aluminum is weighed out. The paste, 41.2 g glycol ether EB, 5.1 g Texanol (supplier—Eastman), 1.03 g Patcote 519 (supplier—Patcote), 0.62 g Dow Corning 14 (supplier—Dow), 73.5 g deionized water, and 313.7 g Joncryl 537 Resin, an acrylic emulsion (supplier—Johnson Wax) are blended together to form a uniform coating.

The formulations are placed in a constant temperature bath at 52° C. and the gas evolved is collected in an inverted water-filled buret for 168 hours. The data are summarized in Table 1.

TABLE 1

| ALUMINUM PASTE FEED | REAGENT | AMOUNT | PROCESS | GASSING (mls.) |
| --- | --- | --- | --- | --- |
| Example 1- TIFFLAKE ™ 5843 | Phosphomolybdic Acid | 10% | 5 hrs. 80° C. | 37 |
| Example 2- TIFFLAKE ™ 5843 | Silicomolybdic Acid | 10% | 5 hrs. 80° C. | 70 |
| Example 3- TUFFLAKE ™ 5843 | Phosphotungstic Acid | 10% | 5 hrs. 80° C. | 146 |
| Comparative Example 1 | None | 0 | — | 181 |

The results clearly show that the use of a heteropoly anion as an inhibitor reduces undesirable gassing and that the type of heteropoly anion used affects the amount of observed gassing.

The finished aluminum paste of Example 1 was incorporated into an aqueous automotive basecoat formulation. The formulation obtained was sprayed onto electrocoated steel panels, and then clear coated with a solvent-borne automotive formulation. This panel was placed in an enclosed chamber maintained at 100° F. (38° C.) and 100% relative humidity, in accordance with ASTM D2247-87. After 10 days of exposure, the panel was removed from the chamber and dried. No blistering or visual degradation was noted. The panel was then tested for adhesion, in accordance with ASTM D3359-87, Test Method B. No loss of adhesion occurred.

EXAMPLE 4

112.2 grams of a non-leafing aluminum paste feed SPARKLE SILVER® 5245-AR (non-volatile of 78.1%) is slurried with 531.4 grams of glycol ether PM to yield a slurry concentration of 13.6% aluminum. To this slurry 1.6% by weight phosphomolybdic acid is added, based on the weight of aluminum in the paste feed. The material is agitated for two hours, at 80° C. The slurry is then filter pressed to obtain a finished paste of 66% non-volatile content and then tested for aqueous stability as described below.

EXAMPLE 5

41.3 grams of a non-leafing aluminum paste feed SPARKLE SILVER® 5245-AR is slurried with 602.4 grams of glycol ether PM to yield a slurry concentration of 5.0% aluminum. To this slurry 4.0% by weight phosphomolybdic acid is added, based on the weight of aluminum in the paste feed. The material is agitated for five hours, at 80° C. The slurry is then filter pressed to obtain a finished paste of 68.1% non-volatile content and then tested for aqueous stability as described below.

EXAMPLE 6

76.8 grams of a non-leafing aluminum paste feed SPARKLE SILVER® 5245-AR is slurried with 562.2 grams of glycol ether PM to yield a slurry concentration of 9.4% aluminum. To this slurry 10.0% by weight phosphomolybdic acid is added, based on the weight of aluminum in the paste feed. The material is agitated for 0.5 hours, at 80° C. The slurry is then filter pressed to obtain a finished paste of 68.8% non-volatile content and then tested for aqueous stability as described below.

EXAMPLE 7

41.3 grams of a non-leafing aluminum paste feed SPARKLE SILVER® 5245-AR is slurried with 600.5 grams of glycol ether PM to yield a slurry concentration of 5.0% aluminum. To this slurry 10.0% by weight phosphomolybdic acid is added, based on the weight of aluminum in the paste feed. The material is agitated for 2 hours, at 55° C. The slurry is then filter pressed to obtain a finished paste of 68.2% non-volatile content and then tested for aqueous stability as described below.

EXAMPLE 8

112.2 grams of a non-leafing aluminum paste feed SPARKLE SILVER® 5245-AR is slurried with 524 grams of glycol ether PM to yield a slurry concentration of 13.8% aluminum. To this slurry 10.0% by weight phosphomolybdic acid is added, based on the weight of aluminum in the paste feed. The material is agitated for 5 hours, at 30° C. The slurry is then filter pressed to obtain a finished paste of 65.2% non-volatile content and then tested for aqueous stability as described below.

COMPARATIVE EXAMPLE 2

112.7 grams of a non-leafing aluminum paste feed SPARKLE SILVER® 5245-AR is slurried with 474 grams of glycol ether PM to yield a slurry concentration of 15% aluminum. In order to provide a comparative example, no heteropoly anion is added to this slurry. The slurry is then filter pressed to obtain a finished paste of 70% non-volatile content and then tested for aqueous stability as described below.

Each of the finished aluminum pastes obtained from the above examples is incorporated into a general industrial aqueous coating formulation. The formulations are placed in a constant temperature bath at 52° C., and the gas evolved is collected in an inverted water-filled buret for 168 hours. The data are summarized in Table 2.

TABLE 2

| ALUMINUM PASTE FEED | EXPERIMENTAL CONDITIONS | | | | GASSING (mls.) |
|---|---|---|---|---|---|
| | AMOUNT PMoA | TIME (Hrs.) | TEMPERA- TURE | SLURRY CONC. | |
| Example 4-SPARKLE SILVER ® 5245-AR | 1.6% | 2 | 80° C. | 13.6% Al | 50.2 |
| Example 5-SPARKLE SILVER ® 5245-AR | 4.0% | 5 | 80° C. | 5.0% Al | 32.0 |
| Example 6-SPARKLE SILVER ® 5245-AR | 10.0% | 0.5 | 80° C. | 9.3% Al | 48.4 |
| Example 7-SPARKLE SILVER ® 5245-AR | 10.0% | 2 | 55° C. | 5.0% Al | 39.4 |
| Example 8-SPARKLE SILVER ® 5245-AR | 10.0% | 5 | 30° C. | 13.6% Al | 36.1 |
| Comparative Example 2 | None | — | — | 15% Al | 193.3 |

The data clearly shows that the use of a heteropoly anion reduces the amount of undesirable gassing compared to an untreated sample.

EXAMPLE 9

112 grams of a non-leafing aluminum paste feed SPARKLE SILVER® 5245-AR (Non-Volatile 78.2%), is slurried with 464.0 grams of mineral spirits to yield a slurry concentration of 15.2% aluminum. To this slurry 10% by weight calcium strontium zinc phosphosilicate is added, based on the weight of aluminum in the paste feed. The material is agitated for five hours, at 30° C. The slurry is then filter pressed to obtain a finished paste of 72.6% non-volatile content and then tested for aqueous stability as described below.

COMPARATIVE EXAMPLE 3

137 grams of a non-leafing aluminum paste feed SPARKLE SILVER® 5245-AR is slurried with 447 grams of mineral spirits to yield a slurry concentration of 15% aluminum. In order to provide a comparative example, no calcium strontium zinc phosphosilicate is added to this slurry. The slurry is then filter pressed to obtain a finished paste of 64% non-volatile content and then tested for aqueous stability as described below.

Each of the finished pastes obtained from the above examples is incorporated into a typical aqueous general industrial coating formulation prepared according to the following procedure. Enough of each paste to yield 20.5 g of aluminum is weighed out. The paste, 41.2 g glycol ether EB, 5.1 g Texanol (supplier—Eastman), 1.03 g Patcote 519 (supplier—Patcote), 0.62 g Dow Corning 14 (supplier—Dow), 73.5 g deionized water, and 313.7 g Joncryl 537

Resin, an acrylic emulsion (supplier—Johnson Wax) are blended together to form a uniform coating.

The coating formulations are placed in a constant temperature bath at 52° C. and the gas evolved is collected in an inverted water-filled burst for 168 hours. The data are summarized in Table 3.

TABLE 3

| ALUMINUM PASTE FEED | GASSING (mls.) |
|---|---|
| Example 9-SPARKLE SILVER® 5245-AR | 14.95 |
| Comparative Example 3 | 193.30 |

The data clearly show that the use of calcium strontium zinc phosphosilicate as an inhibitory pigment reduces undesirable gassing by more than an order of magnitude compared to untreated samples.

EXAMPLE 10

76.8 grams of a non-leafing aluminum paste feed SPARKLE SILVER® 5245-AR is slurried with 502.2 grams of mineral spirits to yield a slurry concentration of 10.4% aluminum. To this slurry 1.6% by weight calcium strontium zinc phosphosilicate is added, based on the weight of aluminum paste in the feed. The material is agitated for 5 hours, at 55° C. The slurry is then filter pressed to obtain a finished paste of 76% non-volatile content and then tested for aqueous stability as described below.

EXAMPLE 11

41.6 grams of a non-leafing aluminum paste feed SPARKLE SILVER® 5245-AR is slurried with 540.5 grams of mineral spirits to yield a slurry concentration of 5.5% aluminum. To this slurry 4.0% by weight calcium strontium zinc phosphosilicate is added, based on the weight of aluminum paste in the feed. The material is agitated for 5 hours, at 80° C. The slurry is then filter pressed to obtain a finished paste of 76% non-volatile content and then tested for aqueous stability as described below.

EXAMPLE 12

124.3 grams of a non-leafing aluminum paste feed TUF-FLAKE® 5843 (Non-Volatile 70.8%) is slurried with 429 grams of mineral spirits to yield a slurry concentration of 15.9% aluminum. To this slurry 10% by weight calcium strontium zinc phosphosilicate is added, based on the weight of aluminum in the paste feed. The material is agitated for one hour, at ambient temperature. The slurry is then filter pressed to obtain a finished paste of 73.2% non-volatile content and then tested for aqueous stability as described below.

EXAMPLE 13

124.3 grams of a non-leafing aluminum paste feed TUF-FLAKE® 5843 is slurried with 429 grams of mineral spirits to yield a slurry concentration of 15.9% aluminum. To this slurry 15% by weight calcium strontium zinc phosphosilicate is added, based on the weight of aluminum in the paste feed. The material is agitated for one hour, at ambient temperature. The slurry is then filter pressed to obtain a finished paste of 70.7% non-volatile content and then tested for aqueous stability as described below.

EXAMPLE 14

124.3 grams of a non-leafing aluminum paste feed TUF-FLAKE® 5843 is slurried with 429 grams of mineral spirits to yield a slurry concentration of 15.9%. To this slurry 20% by weight calcium strontium zinc phosphosilicate is added, based on the weight of aluminum in the paste feed. The material is agitated for one hour, at ambient temperature. The slurry is then filter pressed to obtain a finished paste of 69.2% non-volatile content and then tested for aqueous stability as described below.

The finished aluminum pastes obtained from the above examples are incorporated into general industrial aqueous coating formulations. The formulations are placed in a constant temperature bath at 52° C., and the gas evolved is collected in an inverted water-filled buret for 168 hours. The data is summarized in Table 4.

TABLE 4

| | EXPERIMENTAL CONDITIONS | | | | |
|---|---|---|---|---|---|
| ALUMINUM PASTE FEED | AMOUNT PMoA | TIME (Hrs.) | TEMPERATURE | SLURRY CONC. | GASSING (mls.) |
| Example 10-SPARKLE SILVER® 5245-AR | 1.6% | 5 | 55° C. | 10.4% Al | 182.15 |
| Example 11-SPARKLE SILVER® 5245-AR | 4.0% | 5 | 80° C. | 5.5% Al | 128.15 |
| Example 9-SPARKLE SILVER® 5245-AR | 10.0% | 5 | 30° C. | 15.2% Al | 14.95 |
| Example 12-TUFFLAKE™ 5843 | 10.0% | 1 | Ambient | 15.9% Al | 9.40 |
| Example 13-TIFFLAKE™ 5843 | 15.0% | 1 | Ambient | 15.9% Al | 4.80 |
| Example 14-TUFFLAKE™ 5843 | 20.0% | 1 | Ambient | 15.9% Al | 6.70 |

The data clearly shows that different amounts of calcium strontium zinc phosphosilicate affect the amount of undesirable gassing. It can also be seen that the processing variables of time and temperature affect the level of undesirable gassing.

Each of the finished aluminum pastes of Examples 9 and 12 was incorporated into an aqueous automotive basecoat formulation. The formulations obtained were sprayed onto electrocoated steel panels, and then clear coated with a solvent-borne automotive formulation. These panels were placed in an enclosed chamber maintained at 100° F. (38° C.) and 100% relative humidity, in accordance with ASTM D2247-87. After 10 days of exposure, the panels were removed from the chamber and dried. No blistering or visual degradation was noted. The panels were then tested for adhesion, in accordance with ASTM D3359-87, Test Method B. No loss of adhesion occurred.

EXAMPLE 15

139.1 grams of a non-leafing aluminum paste feed SPARKLE SILVER® 5745 ALUMINUM PASTE (non-volatile 64.7%) is slurried in 513.7 grams of glycol ether PM. To this slurry 2.78% by weight phosphomolybdic acid and 10% by weight calcium strontium zinc phosphosilicate is added, based on the weight of aluminum in the paste feed. The material is agitated for five (5) hours, at 80° C. The slurry is then filter pressed to obtain a finished paste product and then tested for aqueous stability as described below.

EXAMPLES 16–27 AND COMPARATIVE EXAMPLES 4–7

The procedure of Example 15 is repeated, varying the amounts of phosphomolybdic acid and calcium strontium zinc phosphosilicate. For the comparative examples, only one of the reagents is used. The formulations are detailed in Table 5.

evolved is collected in an inverted water-filled buret for 168 hours. The data are summarized in Table 5.

Several of these aqueous automotive base coat formulations were sprayed onto electrocoated steel panels, and then clear coated with a solvent-borne automotive formulation. These panels were placed in an enclosed chamber maintained at 100° F. (38° C.) and 100% relative humidity, in accordance with ASTM D2247-87. After 10 days of exposure, the panels were removed from the chamber, dried, and inspected for blistering or visual degradation. The panels were then tested for adhesion, in accordance with ASTM D3359-87, Test Method B. The data are summarized in Table 5.

TABLE 5

| | PHOSPHO-MOLYBDIC ACID, % | CALCIUM STRONTIUM ZINC PHOSPHOSILICATE | TOTAL INHIBITOR | GENERAL INDUSTRIAL GASSING | AUTO-MOTIVE GASSING | HUMIDITY RESISTANCE | |
|---|---|---|---|---|---|---|---|
| | ON AL | % ON ALUMINUM | % ON AL | (mls) | (mls) | AESTHETICS | ADHESION LOSS |
| EX. | | | | | | | |
| 1 | 2.78 | 10.0 | 12.78 | 0 | 0.4 | N/T | N/T |
| 2 | 4.0 | 7.5 | 11.5 | 1.7 | N/T | N/T | N/T |
| 3 | 1.25 | 10.0 | 11.25 | 0.3 | 0 | Good | 0 |
| 4 | 0.75 | 10.0 | 10.75 | 0.3 | N/T | N/T | N/T |
| 5 | 0.2 | 10.0 | 10.2 | 3.5 | 0 | Good | 0 |
| 6 | 2.5 | 7.5 | 10.0 | 0.85 | 0 | Good | 0 |
| 7 | 5.0 | 5.0 | 10.0 | 3.85 | 0 | Good | 0 |
| 8 | 7.5 | 2.5 | 10.0 | 7.6 | 0 | N/T | N/T |
| 9 | 1.0 | 8.4 | 9.4 | 4.5 | N/T | N/T | N/T |
| 10 | 1.0 | 7.5 | 8.5 | 3.45 | N/T | N/T | N/T |
| 11 | 3.5 | 3.5 | 7.0 | 16.25 | 0 | N/T | N/T |
| 12 | 1.0 | 5.0 | 6.0 | 14.90 | N/T | N/T | N/T |
| 13 | 1.25 | 1.25 | 2.5 | 28.65 | 0 | N/T | N/T |
| COMP. EX. | | | | | | | |
| 1 | 10.0 | 0 | 10.0 | 45.05 | 0 | Good | 0 |
| 2 | 5.0 | 0 | 5.0 | 78.5 | N/T | N/T | N/T |
| 3 | 0 | 10.0 | 10.0 | 25.05 | 12.55 | Good | 0 |
| 4 | 0 | 4.0 | 4.0 | 127.7 | N/T | N/T | N/T |

N/T = NOT TESTED

Each of the finished pastes obtained from the above examples is incorporated into a typical aqueous general industrial coating formulation prepared according to the following procedure. Enough of each paste to yield 20.5 g of aluminum is weighed out. The paste, 41.2 g glycol ether EB, 5.1 g Texanol (supplier—Eastman), 1.03 g Patcote 519 (supplier—Patcote), 0.62 g Dow Corning 14 (supplier—Dow), 73.5 g deionized water, and 313.7 g Joncryl 537 Resin, an acrylic emulsion (supplier—Johnson Wax) are blended together to form a uniform coating.

The formulations are placed in a constant temperature bath at 52°C and the gas evolved is collected in an inverted water-filled buret for 168 hours. The data are summarized in Table 5.

Some of the finished pastes obtained from the above examples are also incorporated into a proprietary aqueous automotive base coat formulation. The formulations are placed in a constant temperature bath at 52°C and the gas

EXAMPLE 28

Untreated SS-5745 was incorporated into a typical aqueous geneal industrial formulation prepared according to the following procedure. Enough paste to yield 20.5 g. of aluminum is weighed out. The paste, 41.2 g. of Glycol Ether EB, 5.1 g. Texanol (Supplier: Eastman Chemical), 73.5 g. deionized water, and 313.7 g. Joncryl 537 resin, an acrylic emulsion (Supplier: Johnson Wax) were blended together to form a uniform coating.

The paints were then treated insitu with calcium strontium zinc phosphosilicate at levels of 0%, 5%, 10%, and 15% on metal weight in the formulation. The paints were then subjected to the gassing test (as described previously) and the results are shown in Table 6.

TABLE 6

| Paint | Calcium Strontium Zinc Phosphosilicate % on Aluminum Insitu Treatment | Gassing (mls) |
| --- | --- | --- |
| SS-5745/Joncryl 537 Paint | 0 | 143.00 |
|  | 5 | 43.3 |
|  | 10 | 17.25 |
|  | 15 | 17.35 |

As can be seen from the table, the insitu addition improves the gassing stability over untreated paints.

In the general industrial formulation, all the combinations of heteropoly anion and phosphosilicate compound yield lower gassing than the heteropoly anion compound, alone, or the phosphosilicate compound alone, at the 4% level; and all but one are lower than the phosphosilicate compound, alone, at the 10% level. In the automotive formulation, all the combinations of heteropoly anion and phosphosilicate compound, yield lower gassing than the phosphosilicate compound, alone, and are equivalent to the heteropoly anion compound, alone. All provide good aesthetics and no adhesion loss in the humidity test.

While there is shown and described herein certain specific examples embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shown and described except insofar as indicated in the scope of the appended claims.

The entirety of everything cited above or below is expressly incorporated herein by reference.

REFERENCES

1. Cotton, F. Albert, and Wilkinson, Geoffrey, Advanced Inorganic Chemistry, 4th Ed., published by Wiley-Interscience.

What is claimed is:

1. A metal pigment-containing paste suitable for formation of a coating composition, comprising:
   metal pigment particles;
   a solvent;
   and a treating agent for the metal pigment particles selected from the group consisting of at least one heteropolyanion compound, at least one phosphosilicate compound, and a combination of at least one heteropolyanion and at least one phosphosilicate compound.

2. The metal pigment-containing paste of claim 1, wherein the metal pigment particles comprise aluminum.

3. The metal pigment-containing paste of claim 1, wherein the metal pigment particles comprise zinc.

4. The metal pigment-containing paste of claim 1, wherein the metal pigment particles comprise bronze.

5. The metal pigment-containing paste of claim 1, wherein the metal pigment particles are present in an amount of from approximately 40% to approximately 90% by weight of the paste.

6. The metal pigment-containing paste of claim 1, wherein the heteropoly anion is present in an amount of from approximately 0.1% to approximately 30.0% by weight of the metal pigment particles.

7. The metal pigment-containing paste of claim 6, wherein the amount of heteropolyanion compound is from approximately 1.0% to approximately 10% by weight of the metal pigment particles.

8. The metal pigment-containing paste of claim 1, wherein the heteropolyanion compound is present and the solvent comprises at least one member selected from the group consisting of glycol ethers, glycol ether acetates, alcohols, water and nitroparaffins.

9. The metal pigment-containing paste of claim 1, wherein the heteropolyanion compound is present and comprises at least one member selected from the group consisting of silicomolybdic acid, phosphotungstic acid, silicotungstic acid and phosphomolybdic acid.

10. The metal pigment-containing paste of claim 9, wherein the heteropoly anion comprises phosphomolybdic acid.

11. The metal pigment-containing paste of claim 1, wherein the solvent further comprises a surface active agent.

12. The metal pigment-containing paste of claim 1, wherein the phosphosilicate compound is present in an amount of from approximately 0.1% to approximately 30.0% by weight of the metal pigment particles.

13. The metal pigment-containing paste of claim 12, wherein the amount of phosphosilicate compound is approximately 10% by weight of the metal pigment particles.

14. The metal pigment-containing paste of claim 12, wherein the phosphosilicate compound is present and the solvent comprises at least one member selected from the group consisting of mineral spirits, high flash naphtha, glycol ethers, glycol ether acetates, nitroparaffins, alcohols and acetates.

15. The metal pigment-containing paste of claim 12, wherein the phosphosilicate compound comprises at least one member selected from the group consisting of calcium phosphosilicate, calcium strontium phosphosilicate, aluminum zirconium zinc phosphosilicate and calcium strontium zinc phosphosilicate.

16. The metal pigment-containing paste of claim 15, wherein the phosphosilicate compound comprises calcium strontium zinc phosphosilicate.

17. The metal pigment-containing paste of claim 14, wherein the solvent further comprises a surface active agent.

18. The metal pigment-containing paste of claim 1, wherein a combination of heteropolyanion compound and phosphosilicate compound is present.

19. The metal pigment-containing paste of claim 18, wherein the heteropolyanion compound is present in an amount of from approximately 0.1% to approximately 30.0% by weight of the metal pigment particles.

20. The metal pigment-containing paste of claim 19, wherein the amount of heteropolyanion compound is from approximately 0.2% to approximately 10% by weight of the metal pigment particles.

21. The metal pigment-containing paste of claim 18, wherein the phosphosilicate compound is present in an amount of from approximately 0.1% to approximately 30.0% by weight of the metal pigment particles.

22. The metal pigment-containing paste of claim 21, wherein the amount of phosphosilicate compound is from approximately 1.0% to approximately 10% by weight of the metal pigment particles.

23. The metal pigment-containing paste of claim 18, wherein the solvent comprises at least one member selected from the group consisting of glycol ethers, glycol ether acetates, alcohols, water and nitroparaffins.

24. The metal pigment-containing paste of claim 18, wherein the heteropolyanion compound comprises at least one member selected from the group consisting of silicomolybdic acid, phosphotungstic acid, silicotungstic acid and phosphomolybdic acid.

25. The metal pigment-containing paste of claim 24, wherein the heteropoly anion comprises phosphomolybdic acid.

26. The metal pigment-containing paste of claim 18, wherein the phosphosilicate compound comprises at least one member selected from the group consisting of calcium phosphosilicate, calcium strontium phosphosilicate, aluminum zirconium zinc phosphosilicate and calcium strontium zinc phosphosilicate.

27. The metal pigment-containing paste of claim 26, wherein the phosphosilicate compound comprises calcium strontium zinc phosphosilicate.

28. The metal pigment-containing paste of claim 18, wherein the solvent further comprises a surface active agent.

29. An aqueous coating composition comprising:

a metal pigment-containing paste as claimed in claim 1; and an aqueous carrier.

30. A method of making a metal pigment-containing paste useful for forming a coating composition, comprising:

(a) producing metal particles; and (b) contacting the metal particles with at least one heteropolyanion compound, at least one phosphosilicate compound or a combination of least one heteropolyanion compound and at least one phosphosilicate compound.

31. A coating composition comprising the metal pigment-containing paste made according to the method of claim 30.

32. In a painted automobile, the improvement comprising paint containing metal particles which have been treated with at least one heteropolyanion compound, at least one phosphosilicate compound or a combination of at least one heteropolyanion compound and at least one phosphosilicate compound.

33. A coating composition, comprising:

metal pigment particles;

an aqueous carrier; and a treating agent for the metal pigment particles selected from the group consisting of at least one heteropolyanion compound, at least one phosphosilicate compound, and a combination of at least one heteropolyanion compound and at least one phosphosilicate compound.

34. A method of making a coating composition, comprising:

adding metal pigment particles to an aqueous carrier and adding a treating agent for the metal pigment particles selected from the group consisting of at least one heteropolyanion compound, at least one phosphosilicate compound, and a combination of at least one heteropolyanion and at least one phosphosilicate compound to the aqueous carrier.

35. A method of making a paint, comprising blending the metal pigment-containing paste of claim 1 with an aqueous carrier to form a paint.

36. The method of claim 34, wherein the metal pigment particles are added to the aqueous carrier prior to the treating agent.

* * * * *